Sept. 20, 1966   J. M. LIND   3,273,243
BREAD MARKING DEVICE
Filed Oct. 23, 1963
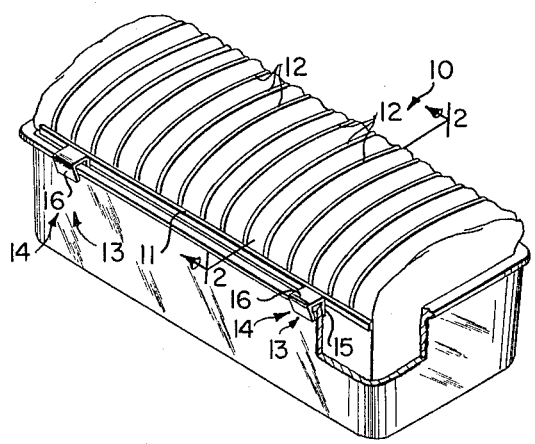
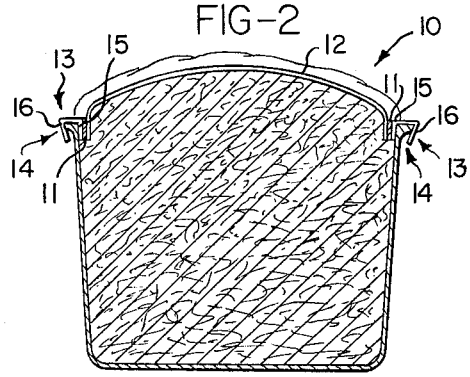
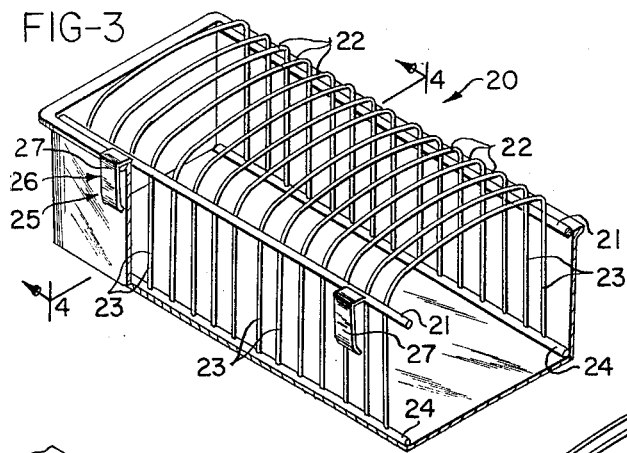
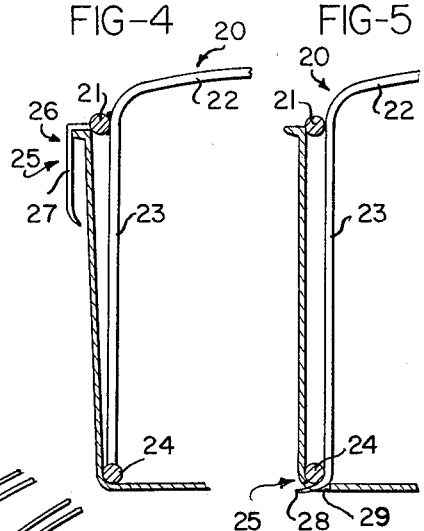
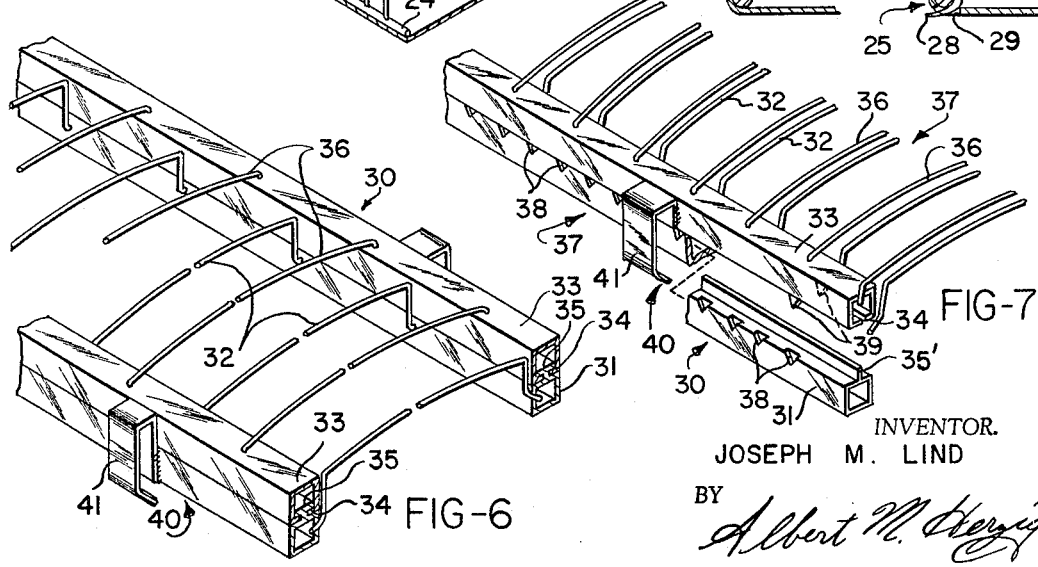
INVENTOR.
JOSEPH M. LIND
BY
*Albert M. Herzig*
ATTORNEY United States Patent Office 3,273,243
Patented Sept. 20, 1966

1

3,273,243
BREAD MARKING DEVICE
Joseph M. Lind, 400 N. Sycamore St.,
Los Angeles, Calif.
Filed Oct. 23, 1963, Ser. No. 318,245
8 Claims. (Cl. 33—1)

In general, the present invention relates to a device for marking bread to facilitate the subsequent slicing of said bread. More specifically, the present invention involves an inexpensive bread marking device adapted to form shallow grooves in and conforming to the upper surface of the loaf of bread being formed by baking a mound of dough without substantially restricting the expansion of said dough mound or its contact with its environment.

In recent years it has become increasingly popular for the housewife to make her own home-baked bread rather than relying on the generally available commercially baked and sliced bread. Customarily, the bread baked in the home is formed out of a mound of dough baked in an oven in either a bread pan or simply a flat sheet of metal and then subsequently sliced, since such procedure affords a simple, direct manner of achieving the loaf size and configuration selected by the housewife. One of the problems involved with such home-baked bread is the subsequent production of uniform slices of bread. In order to achieve such uniform slices when slicing is done manually with a bread knife, it is necessary that the surface of the loaf of bread be marked to indicate the path of the knife blade. However, such bread marking has to be done in a simple, inexpensive manner in order to remain compatible with the over-all simplicity of operation in the home baking of bread.

Consequently, an object of the present invention is a simple, inexpensive, easily utilized bread marking device.

Another object of the present invention is a bread marking device which is adapted to form shallow grooves in and conforming to the upper surface of a loaf of bread being formed by baking a mound of dough without substantially restricting the expansion of said dough mound or its contact with its environment.

Still another object of the present invention is a bread marking device which may be utilized with a free mound of dough or attached to a bread pan to be used with a mound of dough being baked therein.

Still another object of the present invention is a bread marking device which is adapted not only to mark the upper surface of the bread but also the sides of the bread.

Still another object of the present invention is a bread marking device which is adapted to be lengthened or shortened, depending on the length of the loaf of bread and which can form different slice thicknesses.

Other objects and advantages of the present invention will be readily apparent from the following description and drawings which illustrate a preferred exemplary embodiment of the present invention, as well as alternative embodiments of the present invention.

In general, the present invention involves a bread marking device comprising a pair of spaced, parallel anchor rods and a series of spaced parallel arches extending between said anchor rods, said arches being curved to conform to the upper surface of a loaf of bread being formed by baking a mound of dough. The bread marking device may also include connecting means for attaching said device to a bread pan and each of said arches may have a shaft at each end extending downwardly substantially perpendicular to the plane formed by said anchor rods. The adjoining ends of said shafts are connected by a pair of spaced, parallel base rods. In addition, the bread marking device may include a pair of spaced, parallel slide rods slidably mounted on the upper surfaces of said anchor rods and a series of spaced parallel arches extending between said slide rods with said arches being curved to conform to the upper surface of a loaf of bread being formed by baking a mound of dough.

In order to facilitate understanding of the present invention, reference will now be made to the appended drawings of a preferred specific embodiment of the present invention. Such drawings should not be construed as limiting the invention which is properly set forth in the appended claims.

In the drawings:

FIG. 1 is a perspective view of the bread marking device of the present invention shown installed in a bread pan.

FIG. 2 is a cross-sectional view of FIG. 1 taken along the line 2—2 of FIG. 1.

FIG. 3 is a perspective view of another embodiment of the bread marking device of the present invention shown installed in a bread pan which is partially broken away.

FIG. 4 is an end view of FIG. 3 taken along the line 4—4 of FIG. 3.

FIG. 5 is similar to FIG. 3 and shows an alternative connecting means for attaching the bread marking device of the present invention to a bread pan.

FIG. 6 is a perspective view of still another alternate embodiment of the present invention.

FIG. 7 is a perspective view of still another alternate embodiment of the present invention.

As illustrated in FIGS. 1 and 2, the present invention involves a bread marking device 10 comprising a pair of spaced, parallel anchor rods 11. The anchor rods 11 may be formed out of a suitable, strong, heat-resistant material, such as metal, e.g., stainless steel or brass, or plastic or metal coated with plastic. Further, the anchor rods 11 may have any suitable cross-sectional shape, such as a square or circle, and their dimensions may be about 10 to 15 inches in length and, assuming a square cross section, ⅛ to ¼ inch square. The space between the rods depends upon the size of the loaf being baked, but customarily such spacing will be in the range of about 4 to 6 inches.

Extending between and connected to the anchor rods 11 are a series of spaced, parallel arches 12. The arches 12 are curved to conform to the upper surface of a loaf of bread being formed by baking a mound of dough. The arches 12 may be formed out of any strong, heat-resistant, resilient material, such as metal wire or plastic wire or metal wire coated with plastic. In this way, the bread marking device is adapted to vary the width between the anchor rods by appropriately bending the arches. Concurrently, the curvature of the arches may be conformed to the specific curvature of the mound of dough being formed. The arches may be suitably formed out of wire or rods about 1/16 to ⅛ inch in diameter.

The bread marking device 10 also includes connecting means 13 for attaching the device to a bread pan. The connecting means 13 comprises a set of spring clamps 14 adapted to attach the device to the top of a bread pan (not shown). The spring clamps 14 are formed out of an inner tab 15 and an outwardly-extending, curved, resilient bracket 16. Thus, when the tab 15 is slidably contacted with the inner surface of the wall of the bread pan, the bracket 16 resiliently clips onto the outer surface of the bread pan wall.

As illustrated in FIGS. 3, 4 and 5, the bread marking device 20 has a pair of spaced, parallel, anchor rods 21 and a series of spaced, parallel arches 22 extending therebetween. Each of the arches 22 has a shaft 23 at each end extending downwardly substantially perpendicular to the plane formed by the anchor rods 21. The adjoining ends of the shafts 23 are connected by a pair of spaced, parallel base rods 24. The shafts 23 may be formed out of the same material as the arches 22 and their length depends on the size of the loaf which is being formed. Thus, their dimension may range from about 2 to 4 inches. Similarly, the base rods may be formed out of the same material as the anchor rods and have substantially the same dimension as the anchor rods.

The connecting means 25 for the bread marking device 20 may be similar to the connecting means 13 illustrated in FIGS. 1 and 2. Thus, as shown in FIGS. 3 and 4, the connecting means 25 includes a clamp 26 formed by a resilient bracket 27 extending outwardly and curved from the shafts 23. When the bread marking device 20 is inserted in a bread pan, the anchor rods 21, base rods 24 or shafts 23 may contact the inner surface of the bread pan walls, while the bracket 27 resiliently clips to the outer surface of the bread pan walls.

Alternatively, the connecting means 25 for the bread marking device 20 may include hooks 28 extending outwardly from the lower end of a plurality of the shafts 23. The hooks 28 are adapted to be received in corresponding apertures 29 in a bread pan, as shown in FIG. 5.

As illustrated in FIGS. 6 and 7, the bread marking device 30 comprises a pair of spaced, parallel anchor rods 31 with a series of spaced parallel arches 32 extending therebetween. The bread marking device 30 also includes a pair of spaced, parallel, slide rods 33 slidably mounted on the upper surfaces of the anchor rods 31. As illustrated in FIG. 6, the slide rods 33 have a longitudinal groove 34 in which is slidably locked a T-shaped ridge 35 extending upwardly from the anchor rod 31. As illustrated in FIG. 7, the simple, vertical ridge 35' is received in the longitudinal groove 34 of the slide rods 33. A series of spaced, parallel arches 36 extend between the slide rods 33 and the arches 36 are similarly curved to conform to the upper surface of the loaf of bread being formed by baking a mound of dough. The slide rods 33 are formed out of the same material as the anchor rods 31 and have substantially the same dimensions. Similarly, the arches 36 are formed out of similar material as the arches 32 and have substantially the same dimensions.

As shown in FIG. 7, the bread marking device 30 also includes positioning means 37 for releasably fixing the relative positions of the slide rods 33 and the anchor rods 31. The positioning means 37 comprises slots 38 in the anchor rods and corresponding bosses 39 on the slide rods 33 which are adapted to be received in slots 38. With such arrangement, the slide rods 33 and their associated arches 36 may be used to lengthen the total length of the marking device 30 merely by sliding the slide rods 31 lengthwise along the anchor rods 31. Thus, the length of the marking device 30 may be extended to any number of slices simply by positioning the arches 36 of the slide rods 33 directly above the arches 32 connected to the anchor rods 31. Alternatively, the arches 36 may be positioned halfway between the arches 32. With such arrangement, the length of the marking device 30 is not substantially changed and yet the size of the resulting bread slices is reduced to one-half.

The marking device 30 also includes connecting means 40 utilizing a bracket 41 extending outwardly and curved from the anchor rods 31. As set forth above, such connecting means 40 is adapted to attach the bread marking device 30 to a bread pan.

The various bread marking devices described and illustrated above may be very simply utilized when baking bread in the home. If simply a flat metal sheet is used to support the mound of dough, the bread marking device may be simply placed over the mound of dough before it is inserted into the oven to be baked. With such arrangement, as the dough rises during baking, the bread marking device is lifted therewith. However, the weight and configuration of the bread marking device is sufficient to form shallow grooves in and conforming to the upper surface of the loaf of bread being formed. Alternatively, if the mound of dough to be baked is placed in a bread pan, the bread marking device may be clipped onto the bread pan so that when the dough rises upon baking it will come in contact therewith. In either case, the bread marking device produces the guide marks needed for slicing the bread. However, it does not substantially restrict the expansion of the dough, since only small pieces of metal are used and the dough may expand freely therebetween. Also, the bread marking device does not restrict the contact of the dough mound with its environment so that the oven gases may freely come in contact therewith and the gases escaping from the mounded dough are not hindered.

Many other specific embodiments of the present invention will be obvious to one skilled in the art in view of this disclosure. For example, a variety of other connecting means may be utilized to connect the bread marking device to a bread pan. Alternatively, the connecting means may be eliminated altogether where the bread marking device is used solely with a mound of dough on a flat sheet. In addition, although it is cheaper to construct the bread marking device with the arches fixed to the anchor rods or slide rods, if desired, the arches may be formed so that they are slidable thereon. With such arrangement, other arches may be added or subtracted between the anchor rods or slide rods and the distance between the thickness of the resulting slices may be suitably varied.

There are many features in the present invention which clearly show the significant advance the present invention represents over the prior art. Consequently, only a few of the more outstanding features will be pointed out to illustrate the unexpected and unusual results obtained by the present invention. One feature of the present invention is the use of a pair of spaced, parallel anchor rods having a series of spaced, parallel arches extending therebetween so that the marking of the bread forms only shallow grooves which conform to the upper surface of the loaf of bread and the expansion of the dough and its contact with the surrounding environment is not substantially restricted. Another feature of the present invention is the utilization of shafts extending downwardly from the arches to mark not only the upper surface of a loaf of bread but also the side surfaces, so that during manual slicing the proper position of the knife can be observed at all times. Still another feature of the present invention is the use of a pair of spaced, parallel slide rods slidably mounted on the anchor rods, with the slide rods having a series of spaced, parallel arches extending therebetween. With such arrangement, the bread marking device may either be extended in length, if desired, or the resulting thickness of the slices may be reduced to one-half by a simple movement of the slide rods with respect to the anchor rods.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

I claim:
1. An inexpensive bread-marking device adapted to form shallow grooves in and conforming to the upper surface of a loaf of bread being formed by baking a mound of dough without substantially restricting the expansion of said dough mound or its contact with its environment, comprising a pair of spaced, parallel anchor rods, a series of spaced, parallel arches extending between said anchor rods, said arches being curved to conform to the upper surface of a loaf of bread being formed by baking a mound of dough, and a set of spring clamps adapted to attach said device to the top of a bread pan.

2. An inexpensive bread-marking device adapted to form shallow grooves in and conforming to the upper surface of a loaf of bread being formed by baking a mound of dough without substantially restricting the expansion of said dough mound or its contact with its environment, comprising a pair of spaced, parallel anchor rods, a series of spaced parallel arches extending between said anchor rods and being curved to conform to the upper surface of a loaf of bread being formed by baking a mound of dough, each of said arches having a shaft in each end extending downwardly substantially perpendicular to the plane formed by said anchor rods, and a pair of spaced, parallel base rods connecting the adjoining ends of said shafts.

3. A bread marking device as stated in claim 2 which includes connecting means for attaching said device to a bread pan.

4. A bread marking device as stated in claim 3 wherein said connecting means comprises hooks extending outwardly from the lower end of a plurality of said shafts, said hooks being adapted to be received in corresponding apertures in a bread pan.

5. An inexpensive bread marking device adapted to form shallow grooves in and conforming to the upper surface of a loaf of bread being formed by baking a mound of dough without substantially restricting the expansion of said dough mound or its contact with its environment, comprising a pair of spaced, parallel anchor rods, a first series of spaced, parallel arches extending between said anchor rods and being curved to conform to the upper surface of a loaf of bread being formed by baking a mound of dough, a pair of spaced parallel slide rods slidably mounted on the upper surfaces of said anchor rods, and a second series of spaced, parallel arches extending between said slide rods and being curved to conform to the upper surface of a loaf of bread being formed by baking a mound of dough.

6. A bread marking device as stated in claim 5 which includes positioning means for releasably fixing the relative positions of said slide rods and anchor rods.

7. A bread marking device as stated in claim 6 wherein said positioning means comprises slots in said anchor rods and corresponding bosses on said slide rods.

8. An inexpensive bread marking device adapted to form shallow grooves in an conforming to the upper surface of a loaf of bread being formed by baking a mound of dough without substantially restricting the expansion of said mound or its contact with its environment, comprising a pair of spaced, parallel anchor rods, a series of spaced, flexible and resilient parallel arches extending between said anchor rods, said arches being curved to conform to the upper surface of a loaf of bread being formed by baking a mound of dough and being deformable to vary the spacing between said anchor rods, and resilient means on said anchor rods for attaching said device to a bread pan.

References Cited by the Examiner

UNITED STATES PATENTS

| | | | |
|---|---|---|---|
| 1,015,892 | 1/1912 | Jefferson | 107—47 XR |
| 2,710,450 | 6/1955 | Stasinos | 33—1 |

LEONARD FORMAN, *Primary Examiner.*

ISAAC LISANN, *Examiner.*